United States Patent [19]

Müller et al.

[11] Patent Number: 5,151,162
[45] Date of Patent: Sep. 29, 1992

[54] RECHARGEABLE STORAGE BATTERY WITH ELECTROACTIVE ORGANIC POLYMER ELECTRODES IN POLAR SOLVENT ELECTROLYTE

[75] Inventors: Klaus Müller, Carouge-Geneve; Antonin Kulhanek, Le Lignon, both of Switzerland

[73] Assignee: Honda Giken Kogyo Kabushiki Kaisha, Tokyo, Japan

[21] Appl. No.: 536,162

[22] Filed: Jun. 7, 1990

[30] Foreign Application Priority Data

Jun. 12, 1989 [EP] European Pat. Off. ........ 89810440.1

[51] Int. Cl.⁵ .................... H01M 2/00; H01M 4/00
[52] U.S. Cl. ..................... 294/131; 204/DIG. 9; 204/130; 205/58; 205/57; 429/213
[58] Field of Search .......... 204/131, 130, DIG. 9; 205/2.1, 57, 58; 429/213

[56] References Cited

U.S. PATENT DOCUMENTS 5,002,700  3/1991  Otagawa et al. ................ 204/72

FOREIGN PATENT DOCUMENTS

| 0104726 | 8/1983 | European Pat. Off. |
| 0143968 | 10/1984 | European Pat. Off. |
| 0315559 | 5/1988 | European Pat. Off. |
| 60-127663 | 7/1985 | Japan |
| 60-225376 | 11/1985 | Japan |
| 61-128478 | 6/1986 | Japan |
| 61-163562 | 7/1986 | Japan |
| 62-170150 | 7/1987 | Japan |
| 62-176046 | 8/1987 | Japan |

OTHER PUBLICATIONS

"Conductive Polymers with Immobized Dopants: Ionomer Composites and Auto-Doped Polymers-a Review and Recent Advances," by Bidan et al. Journal of Physics 1988.
Shimidzu et al. (1987) Journal Chemical Society, Chemical Communications, pp. 327-328.
"Electrochemical Behaviors of Polyprrole, Poly-3-methylthiophene, and Polyaniline Deposited on Nafion-Coated Electrodes"-Takayuki Hirai, Susumu Kuwabata, and Hiroshi Yoneyama-Electrochemical Science and Technology-May 1988-vol. 135, No. 5.
6001 Chemical Abstracts 106 (1987) May, No. 20, Columbus, Ohio, Chemical Abstracts vol. 106, 1987.
"Secondary Battery"-vol. 12, No. 265 (E-637) (3112).
"New Chemical Synthesis of Mixed Conductivity Polymers" Pierre Aldebert, Michel Armand, Gerard Bidan and Michel Pineri J. Chem. Soc., Chem. Commun., 1986 pp. 1636-1638.
"Secondary Cell"-vol. 13, No. 176 (E-749) (3524) (Abstract) Apr. 25, 1989.

Primary Examiner—John Niebling
Assistant Examiner—Arun S. Phasge
Attorney, Agent, or Firm—Birch, Stewart, Kolasch & Birch

[57] ABSTRACT

Cells are disclosed using doped electroconductive polymer electrodes and electrolytes of alkali metal cations and soft anions in polar organic solvents. The structure of the negative electrodes comprises layers of electroconductive polymers and ion exchange resin. Conditioning the negative electrodes is effected with AC current, the energy of the negative pulses exceeding that of the positive pulses.

8 Claims, 1 Drawing Sheet

RECHARGEABLE STORAGE BATTERY WITH ELECTROACTIVE ORGANIC POLYMER ELECTRODES IN POLAR SOLVENT ELECTROLYTE

BACKGROUND OF THE INVENTION

The present invention concerns rechargeable batteries, and more particularly batteries whose electrodes involve conjugated electroconductive organic polymers, as well as a method for conditioning such polymer electrodes.

It is well known that all batteries are formed of a plurality of cells each including at least two electrodes, a negative electrode (defined as the anode) and a positive electrode (defined as the cathode), both being immersed in an ionic conducting liquid (the electrolyte). During discharge of the cell, the electrons leave the anode, flow through an external circuit connected to the electrodes where they do work, and return to the cell via the cathode whose positive charge is thus progressively neutralized. This process continues until an equilibrium is reached, i.e. until when the electron donating substances (at the anode) and electron acceptor substances (at the cathode) are consumed, or when an opposing potential arises at the electrodes due to the presence in the electrolyte of the electrooxidized and corresponding electroreduced products which are formed in the reaction.

For instance, in the classical nickel/cadmium battery in which the cadmium is the anode and nickel oxide is the cathode, the cadmium spontaneously dissolves into an electrolyte solution to form cadmium ions $Cd^{2+}$, giving up electrons to the external circuit while the nickel oxide ($Ni^{III}$) is reduced to $Ni^{II}$ by the incoming electrons. In the electrolyte (aqueous alkali hydroxide solution), the negative charges are carried toward the cadmium electrode (then called "anode") by the hydroxy anions, whereas the positive $Cd^{2+}$ cations move toward the other electrode (then called "cathode").

In recharging, the reverse operations take place: the $Cd^{2+}+$ cations travel the opposite way in the electrolyte to be reduced back to metallic cadmium at the negative electrode (which is defined then as a cathode), while the negative OH— anions go back to the nickel electrode (the anode in this case) where they reoxidize $Ni^{II}$ to $Ni^{III}$. Hence the operation of the Ni/Cd battery involves chemical consumption of electroactive substances in discharge, and upon recharging the original substances are re-formed from the thus chemically modified species, e.g., the cadmium metal is plated out of the cadmium ion solution. Now, cadmium is very toxic and undesirable; however, when replaced by zinc, the reversibility of the above operations is sometimes awkward (dendrite formation) and the number of charge and discharge cycles is rather limited; hence, batteries using polymer electrodes not subjected to periodical consumption and re-formation of electroactive substances are attractive because of their inherent reversibility and prolonged lifetime.

For instance, in cells involving carbon electrode substrates, polyacetylene (or other conjugated electroconductive polymers) electrode materials and an alkali salt, e.g., $LiClO_4$ in a non-aqueous solvent as the electrolyte, the following phenomena occur when charging: the generator pumps off electrons from the positive electrode and drives them through the external circuit to the negative electrode where they "equilibrate" with the positive Li+ cations from the electrolyte (the electrode is doped). Simultaneously, the positive "holes" in the positive electrode are neutralized, and thus the electrode is doped with $ClO_4-$ anions. During discharge the reverse effect takes place.

Among the organic electroconductive polymers, polypyrrole is a favored one because of its long recycling life and easy electrochemical or chemical preparation. So many battery systems involving polypyrrole (pPy) have been reported. Many are hybrid systems in which the positive electrode comprises polypyrrole and the negative electrode is made of an electropositive consumable metal such as alkali metals, metals of Groups II and III of the Periodical Table or alloys thereof (see EP-A-199 175; ALLIED CORP). For illustration, some prior art references are briefly reviewed below.

For instance, Japanese Patent Laid-Open No. 60-225376 (1985), TOYOTA MOTOR CORP., discloses a positive electrode made of carbon fibers coated with pPy or polythiophene and, optionally, other conductive materials such as gold, copper, silver, $In_2O_3$, $SnO_2$, and the like. For making a cell, an Al counterelectrode is used in an $LiClO_4$/acetonitrile solution. On charge, the lithium deposits on the negative electrode, while the positive pPy electrode is doped with $ClO_4-$ ions. A cell with open voltage of 2.5–3 V is thus obtained (the lithium anode is about 2–2.5 V below the Ag/AgCl reference couple).

Japanese Patent Laid-Open No. 62-170150, TOYOTA MOTOR CORP., discloses a battery with stacked electrode couples. The electrodes are similar to that of the previous reference, the use of some further electroactive polymers being listed, e.g., polyaniline, polythiophene (polythienylene) and the like. Listed electrolytes include $LiClO_4$, $R_4NClO_4$, $R_4NPF_6$, $R_4NBF_4$ (R being alkyl) in solvents like acetonitrile, propylene carbonate, benzonitrile, nitromethane, sulfolane and mixtures thereof.

The positive electrodes are manufactured from pieces of knitted carbon fibers which are dipped in 1–2 molar pyrrole/acetonitrile solution containing $LiBF_4$ (2 molar) and electrolyzed against an Al counterelectrode at 7 mA/cm² for an hour. This provides a polypyrrole coat of a few hundred of μm on the graphite knit.

Japanese Patent Laid-Open No. 60-127663, TOYOTA CENTRAL RESEARCH INST., discloses a battery in which the cathode comprises a coat (1–1000 μm thick) of polymer blend or of copolymer of pyrrole and thiophene or alkyl derivatives thereof deposited on current collectors which can be of platinum, gold, nickel, steel, graphite, carbon and the like. The technique for depositing the polymers on the collectors is similar to that disclosed in the previous references using an aluminum negative electrode and lithium salts in polar organic solvents as the electrolyte. Films of electroactive polymers in the range of 100 μm thickness are deposited under at a current density of 7 mA/cm². Current densities around 12 mA/cm² or 1 mA/cm² are reported to be too high or too low, respectively.

Japanese Patent Laid-Open No. 61-163562 (1986), BRIDGESTONE CO., proposes a battery with an electroconductive polymer cathode and an anode of carbon material which dopes upon charging with cations. As such carbon materials cellulose or phenolic resins with conductivities above $10^{-4}$ S/cm are convenient.

The cathode material disclosed in this reference includes polyaniline, polyphenylene, polyfuran, polypyrrole and others. Electrolytes to be used here include alkali metal salts of $ClO_4-$, $PF_6-$, $AsF_6-$, $BF_4-$, $CNS-$, $SO_4{}^{2-}$ and the like in solvents such as propylene and ethylene carbonate, benzonitrile, acetonitrile, tetrahydrofuran (THF), γ-butyrolactone, dioxane, $MeCl_2$, trialkyl-phosphates and -phosphites, DMF, DMSO, dichloroethane, chlorobenzene and the like. In Example of this application, 2.7 mg of carbon textile material was doped for 12.5 hours at 50 μA in $LiClO_4$/propylene carbonate solution against a polyaniline electrode. The charging capacity was 98 Ahr per one kg of polyaniline, 233 Ahr per one kg of carbon and 70 Ahr per kg of both electrode materials. The open circuit voltage was 3.8 V, and the cell voltage was 3.2 V under 50 μA discharge current. The final cell voltage was 2 V and after 50 recycles, no metallic Li was deposited on the anode. The Coulomb efficiency is indicated to be 86%.

Japanese Patent Laid-Open No. 62-176046 (1987), MITSUBISHI CHEM. & SANYO ELECTRIC, discloses secondary batteries in which either the anode or the cathode or both are made of electroconductive polymers, inter alia, polypyrrole and polythiophene, the polymers being deposited into porous substrates to avoid them from becoming disintegrated under use conditions. The reference also discloses in its introductory part that batteries in which both electrodes are made of electroconductive polymers are already proposed by Japanese Patent Publication No. 60-216471 (1985).

Porous substrates indicated in Japanese Patent Laid-Open No. 62-176046 include expanded metals and alloys such as Ni, Ni-Cr, Ni-Cu, N-Fe-Co, Fe-Cr, Cu, Fe, Pb, Cd, Au, Ag and others. Embodiments relate to cells in which the anode is of lithium and the cathode of electropolymerized pyrrole. Capacities of 28 $mAhr/cm^2$ are reported after charging under 7 $mA/cm^2$ in solutions of $LiClO_4$ in propylene carbonate. No workable details are, however, given for cells in which both electrodes are of polypyrrole.

Japanese Patent Laid-Open No. 61-128478, TOYOTA MOTOR CORP., reports a method for the production of negative electrodes of electrically conductive polymers, namely polypyrrole. This reference also reports in its introductory part that it is already known by Denki Kagaku 52 (1984), pp. 80-81, issued by the Japan Electrochemistry Association that polythienylene is previously doped with quaternary ammonium ions to form an "n" type electroactive material. However, the doping was reported not extensive. The materials disclosed in Japanese Patent Laid-Open No. 61-128478 include alkali metal trifluoromethane-sulfonate, $BF_4-$ and $PF_6-$ solutions in acetonitrile, DMF, propylene carbonate, THF, hexamethylphosphoramide and the like as electrolytes. The electrode current collector substrates can be made of Pt or carbon fibers. In Example of this reference, a graphite fiber sheet was coated electrolytically with pPy in a 0.2M solution of pyrrole in acetonitrile (0.2M $Bu_4NCF_3SO_3$ as supporting electrolyte), a Pt sheet being used as the negative counterelectrode. Hence, the obtained pPy electrode was a positively charged, anion-doped material. This polypyrrole electrode was then converted to a negatively charged material by immersing into a 0.2M $Et_4NClO_4$ solution in DMSO and charging against a Pt counterelectrode under 1-10 mA for 1 hour or more. The doping ratio indicated reached 10 mol % calculated on pPy and a terminal discharge voltage of 1.5 V versus the Ag/AgCl reference couple was reported.

When the present inventors attempted to repeat the foregoing experiments, they noted that the reported results were not attained; for instance, the amount of charging and doping was small, and the anode thus conditioned could not be used in the manufacturing of commercially workable batteries.

OBJECT AND SUMMARY OF THE INVENTION

Hence, an object of the present invention is to provide a rechargeable battery having an extremely long service life.

After painstaking efforts, the present inventors have achieved the above object by improving both the structure of the anode and the conditioning technique, which is defined in the annexed claims.

It is interesting to note that although the new structure, i.e. at least one polypyrrole layer and at least one ion exchange resin layer over one another, is a key feature for the negative electrode of the present invention (the anode), the same structure may also suit the positive electrode although it is not indispensable. The reasoning here (although not binding legally) is that the ion exchange resin layer forms a barrier at the anode, which prevents the anode from being undoped (discharged) spontaneously by the anions in the electrolyte, thus strongly improving the self-discharge protection characteristics. The reason why an alternating charging current provides so much enhanced conditioning efficiency (which may exceed 0.1 electron per pyrrole unit) has not been clarified yet.

DETAILED DESCRIPTION OF THE INVENTION

Figure 1:
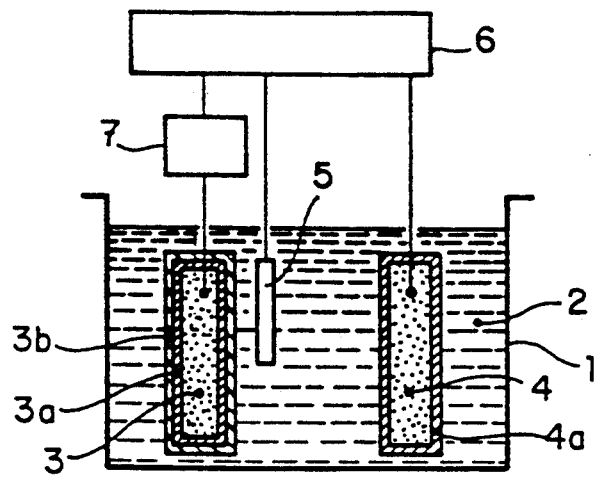
FIG. 1 illustrates schematically a cell arrangement to be used for conditioning electrodes according to the present invention.

The cell represented in FIG. 1 comprises a container 1 filled with an electrolyte solution 2, i.e. a solution of a supporting salt like $LiClO_4$ in a polar organic solvent like propylene carbonate. Two main electrodes 3 and 4, respectively, are immersed in the electrolyte solution 2. The electrodes 3 and 4 are constituted by a current collector made of a metal such as Ni sponge, graphite, carbon fibers, a carbon cloth, etc., coated with layers 3a and 4a of polypyrrole. The electrode 3a further comprises at least one ion exchange resin layer 3b. The ion exchange resin may be, for instance, a resin with sulfonate groups like Amberlite ® or Nafion ®. It should be noted that in the presently illustrated case, the electrode 3 is used as the negative electrode, and the electrode 4 as the positive one. It should also be noted that if the collector material of the electrode 4 is of carbon or graphite capable of forming intercalates with the electrolyte anions, the layer of polypyrrole 4a can be omitted. Finally, in the instant embodiment, the electrode 4 with a polypyrrole layer may also be optionally provided with a layer of ion exchange resin, whereby the two electrodes are formally symmetrical.

The present cell further comprises a reference electrode 5 which can be any conventional reference potential element. Since a lithium salt solution is used in the present embodiment, a lithium foil reference electrode is convenient as it will provide an Li/Li+ couple as a reference potential. The three electrodes in the system are connected to a potentiostat instrument 6, i.e. a conventional circuit which can continuously control and record (via a display or recorder not represented) the current (charge and discharge) in the main electrode circuit (this is measured on ammeter 7) as well as the voltage between the electrodes 3 and 4 and that relative to the reference couple 5.

The polypyrrole coating of the electrodes can be obtained conventionally, for instance, by mechanically coating (pressing or painting) with chemically prepared polypyrrole. The polypyrrole can be prepared, for instance, by oxidizing pyrrole monomer with a ferric salt in aqueous or anhydrous media as disclosed in co-pending WO 87/01504 or by electrooxidation. A convenient way to do this is to dip a collector plate or sheet made of a metal including Ni sponge or carbon in an aqueous solution of pyrrole and an electrolyte salt, for instance, tosylate or mesylate, and submit the collector to anodization against a counterelectrode of, for instance, an inert metal like platinum. A layer of positively charged (p) polypyrrole will then precipitate on the current collector, doping being achieved here by the tosylate ions. In the embodiment of FIG. 1, both electrodes 3 and 4 can be obtained this way. Then, the electrode 3 is further coated with a film of ion exchange resin, for instance, by dipping into a solution or suspension thereof and thereafter drying. Of course, forming a new polypyrrole film over the resin and applying a new resin layer over the polypyrrole can be repeated to obtain a multilayer structure. Alternatively, the electroprecipitation of pPy can be brought about in the presence of a solution or dispersion of the ion exchange resin, whereby a multi-monomolecular layer structure will be formed.

For conditioning the electrode 3 as an anode, the electrode 3 should be first undoped by removing positive charges and doping anions and then reloaded with electrons. As said before, using DC as disclosed in Japanese Patent Laid-Open No. 61-128478 for effecting conditioning was ineffective as depicted in FIG. 2.

Figure 2:
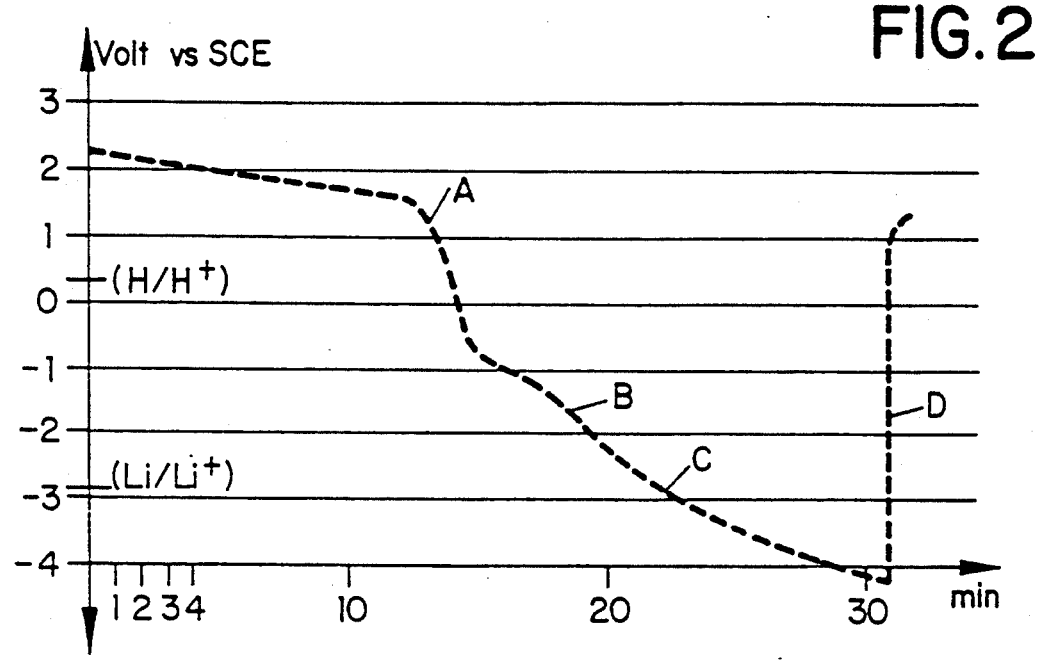
FIG. 2 is a graph representing the potential of a polypyrrole-coated electrode upon attempted charging with negative DC current.

In the experiment illustrated by FIG. 2, a negative current (1 mA/cm$^2$) was applied to the electrode 3 for a period of about 30 min. while recording the potential relative to the reference electrode (in the graph the origin corresponds to the reference potential of a saturated calomel element). So the initial potential was more than 5 V versus the Li/Li+ reference. Undoping did proceed smoothly (letter A), then a steep potential drop was observed and the potential progressively decreased beyond that of Li/Li+. After about 30 min., the cell was allowed to discharge, whereby the negative electrode returned instantaneously to neutral (letter D), showing that the Coulomb efficiency was substantially nought.

Figure 3:
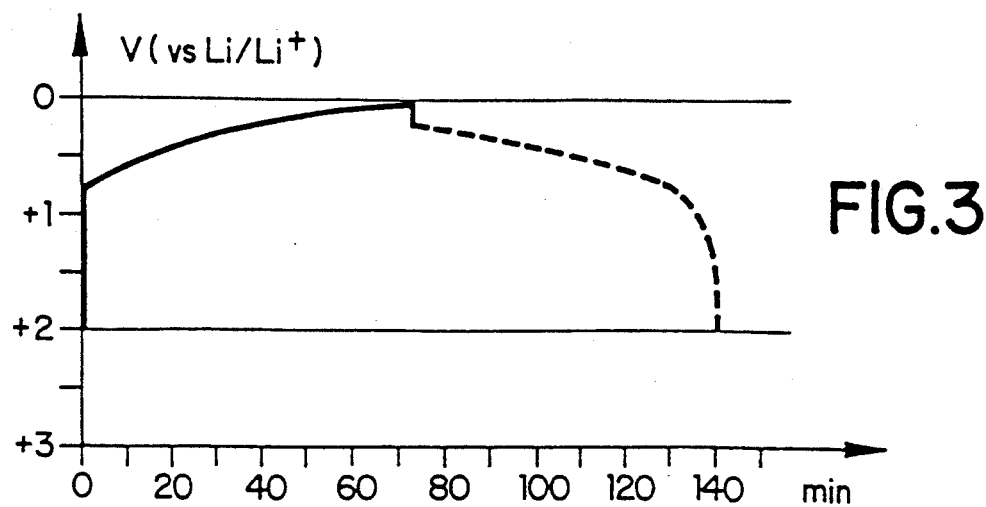
FIG. 3 is a graph representing a charge/discharge cycle for a polypyrrole-coated negative electrode conditioned according to the present invention.

However, when the conditioning was effected by a series of alternating negative and positive pulses (i.e. rapidly changing charging and discharging current), the electrode was efficiently converted to an electronegative electrode (Coulomb efficiency exceeding 0.1 e/pyrrole unit) and excellent long-term cycling behavior was noted. This is illustrated in FIG. 3 which shows the typical charge/discharge cycle of such conditioned electrode in terms of voltage against the Li/Li+ couple with time under current densities of about 1 mA/cm$^2$. The considerable symmetry between the two legs of the curve can be noted, this symmetry being conserved for more than 100 cycles, which indicates excellent stability of the electrode materials. This is probably due to the efficiency of the ion exchange resin membrane in preventing the anions in the electrolyte from discharging at the anode.

The parameters pertaining to the alternating conditioning current in the present invention vary between wide limits.

Preferably the frequency is comprised between about 0.1 and 100 Hz, but this can be exceeded, if necessary.

The average current density is preferably in the range of 5–500 mA/cm$^2$.g, but again these limits can be exceeded depending on electrode construction, thickness of the active layers and structure of the coatings. The negative pulses should exceed the positive pulses by preferably at least 10% but can go to an upper limit of 3 or 4 times. It should be noted that the unbalance of the negative pulses versus the positive ones may not necessarily be in terms of intensity values but can also be in terms of time, i.e., for instance, the intensities may be the same but the negative pulses may last longer than the positive pulses, e.g., 10% longer or twice as long, or the like. This distribution of the pulses can be effected conventionally by usual electronic means with which skilled ones are familiar and which need not be discussed in detail here.

The other parameters like selection of cell solvents, supporting salts, electrode collector materials are all conventional and in conformity with the data from the prior art (see the references cited in the introduction).

The examples below illustrate the present invention in further detail.

EXAMPLE 1

An electrode made of a bundle of strands of about 10,000 graphite fibers (SEROFIM, Gennevilliers, France, size: 30 mm×2 mm, thickness: 2 mm) was connected to a stainless steel current lead wire and dipped into a 1 molar aqueous solution of pyrrole containing 0.5 mol/l of sodium tosylate. The lead wire was protected against attack by the electrolyte. Naturally, other electroconductive materials, such as Pt, Ni, Cu and the like can also be used as lead wires.

A positive current of 10 mA/cm$^2$ was applied to the carbon electrode substrate for 1 hour by using a counterelectrode (a platinum plate of 40 mm×10 mm), whereby about 20 mg of polypyrrole doped with tosylate ions was deposited thereon as a black layer (current yield about 2 g/Ahr). The electrode thus doped in positive form can be stored dry for any period of time.

The above polypyrrole-coated electrode was then coated with a layer of Nafion ® (commercially available from Aldrich Chemical Co., Milwaukee, WI, U. S. A.) by dipping into a 50% by weight solution or suspension of this material, and allowed to dry in the air. This provided an approximately 50-μm layer of ion exchange resin over the polypyrrole layer. It should be noted that these operations can be repeated several times and that the order of deposition of the layers (polypyrrole and Nafion ®) can be reversed. Other commercial ion exchange resins are also convenient.

A Nafion®-coated polypyrrole electrode as prepared by the foregoing procedures and another larger polypyrrole electrode (not carrying a Nafion® overcoat) were used to make a cell of the kind illustrated in FIG. 1. The electrolyte was a 1 molar solution of LiClO$_4$ in propylene carbonate. For conditioning, an alternating current (f=50 Hz) with 1 mA negative pulses and 0.5 mA positive pulses was applied until the voltage became about equal to the reference (Li/Li+); this corresponds to about −2 V with respect to H/H+ standard potential.

Then, the cell was allowed to discharge through the potentiostat 6 as indicated earlier to give the voltage/current curve depicted in FIG. 3. Afterwards, the cycles of charge and discharge (DC only) could be repeated an indefinite number of times (>150 times) without significant loss of electrode performance. The initial charge of more than 0.6 C could be steadily increased to more than 5 C between 0.03 and 2 V, showing the remarkable advantages of the present invention.

EXAMPLE 2

A piece of fine-mesh Ni screen was cut so as to provide a circular current collector. 10 mg of chemically prepared polypyrrole (tosylate-doped) was pressed under 15 ton-pressure onto this screen. A nickel wire was the current lead; it was welded to the screen beforehand. A Nafion® coating was applied to this electrode by dipping into a Nafion® solution (see Example 1) and allowed to dry. After complete drying, the electrode was arranged as shown in FIG. 1 using an electrolyte and a counterelectrode like in Example 1 to make a complete cell. Again, the counterelectrode was larger than the main electrode, so any limitations in performance are attributable to the structure with Nafion®.

The electrolyte was 1M LiClO$_4$ in a mixture of 80% propylene carbonate and 20% ethylene carbonate. For conditioning, 100 pulses of alternating direction (0.5 mA negative, 0.3 mA positive) were applied. The potential of the electrode tested as battery anode was observed during the pulses. It shifted in the negative direction, first slowly and then more markedly, until the negative end potential reached during pulses was in the vicinity of the Li/Li+ potential.

After conditioning, the cell was able to sustain increasing number of charge-discharge cycles, in which the negative electrode having a nickel-polypyrrole-Nafion® structure functioned with a discharging capacity increasing from 15 C/g to over 80 C/g of active material at voltage between 0.01 and 1.8 V versus Li/Li+. The testing was carried out to about 40 cycles, and the faradaic round trip efficiency was 90–96%.

What is claimed is:

1. A method of conditioning the anode of a battery; comprising:
   immersing said anode in a non-aqueous lithium salt solution with a counterelectrode; and
   applying a conditioning current to said anode against said counterelectrode,
   wherein the conditioning current comprises balanced or unbalanced alternating positive and negative pulses and said anode comprises a current collector substrate having deposited thereon at least one polypyrrole layer and at least one layer of ion exchange resin, the polypyrrole layer and the ion exchange resin layer being deposited alternately one over the other.

2. The method according to claim 1, wherein the conditioning current comprises unbalanced alternating positive and negative pulses.

3. The method according to claim 2, wherein the negative pulses predominate over the positive pulses by 10% or more.

4. The method according to claim 3, wherein the negative pulses are of 1–500 mA/cm$^2$.g of polypyrrole, and the positive pulses are about half the negative pulses.

5. The method according to claim 2, wherein the negative pulses last longer than the positive pulses.

6. The method according to claim 2, wherein the anode current collector is made of carbon, the ion exchange resin is a perfluorinated carbosulfonate ion exchange resin, and the electrolyte is LiClO$_4$ in a polar organic solvent.

7. The method according to claim 1, wherein said pulses alternate at a frequency between about 0.1 and 100 Hz.

8. A method for conditioning the anode of a rechargeable battery which has an anode, cathode, and non-aqueous electrolyte solution; comprising:
   applying a conditioning current to said anode that comprises alternating positive and negative pulses,
   wherein said electrolyte solution consists essentially of a non-aqueous lithium salt solution, and said anode comprises a current collector substrate having deposited thereon at least one polypyrrole layer and at least one layer of an ion exchange resin.

* * * * *